United States Patent
Takahashi

(10) Patent No.: US 11,669,288 B2
(45) Date of Patent: Jun. 6, 2023

(54) INFORMATION PROCESSING APPARATUS IN WHICH PRINT QUEUE OF PRINTING APPARATUS CAN BE REGISTERED, CONTROL METHOD OF CONTROLLING INFORMATION PROCESSING APPARATUS, AND NON-TRANSITORY COMPUTER-READABLE MEDIUM

(71) Applicant: CANON KABUSHIKI KAISHA, Tokyo (JP)

(72) Inventor: Kouichi Takahashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/569,154

(22) Filed: Jan. 5, 2022

(65) Prior Publication Data
US 2022/0129213 A1    Apr. 28, 2022

Related U.S. Application Data

(63) Continuation of application No. 16/950,445, filed on Nov. 17, 2020, now Pat. No. 11,249,705.

(30) Foreign Application Priority Data
Nov. 29, 2019    (JP) .............................. JP2019-216689

(51) Int. Cl.
*G06F 3/12* (2006.01)

(52) U.S. Cl.
CPC ............ *G06F 3/126* (2013.01); *G06F 3/1206* (2013.01); *G06F 3/1245* (2013.01); *G06F 3/1256* (2013.01)

(58) Field of Classification Search
None
See application file for complete search history.

(56) References Cited

U.S. PATENT DOCUMENTS

2017/0293454 A1*  10/2017  Beery .................. G06F 3/1206

* cited by examiner

*Primary Examiner* — Lennin R Rodriguezgonzalez
(74) *Attorney, Agent, or Firm* — Canon U.S.A., Inc. IP Division

(57) ABSTRACT

In a case where a print queue of a printing apparatus is registered in operating system standard print software but is not registered in print control software, a process of registering a print queue of a printing apparatus in print control software configured to generate print data in predetermined format. In a case where the print queue of the printing apparatus is registered in the print control software but is not registered in the operating system standard print software, a process of registering the print queue of the printing apparatus in operating system standard print software configured to generate print data in the different format from the predetermined format are executed.

15 Claims, 16 Drawing Sheets

FIG.4
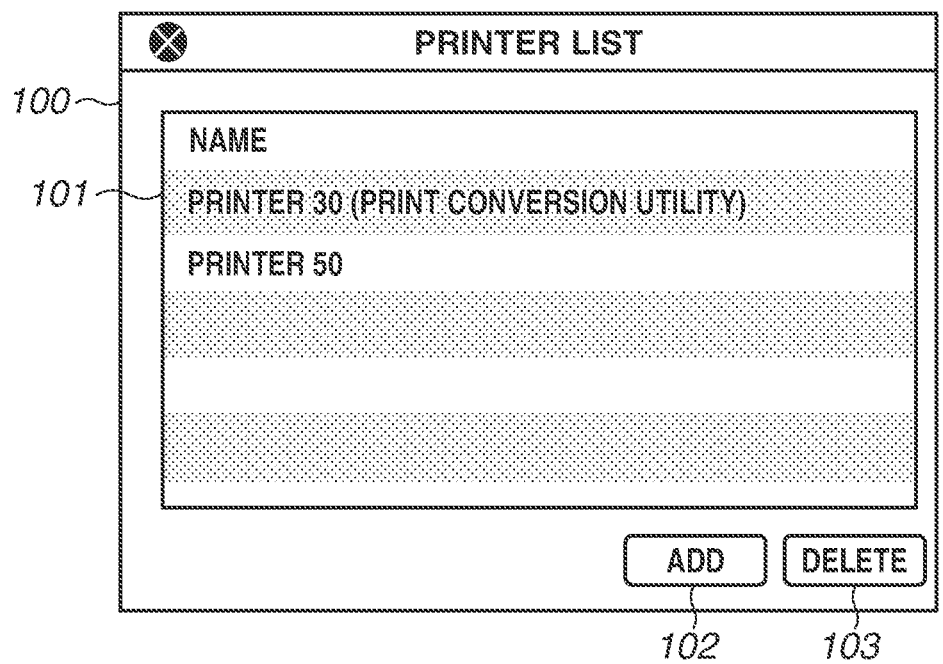
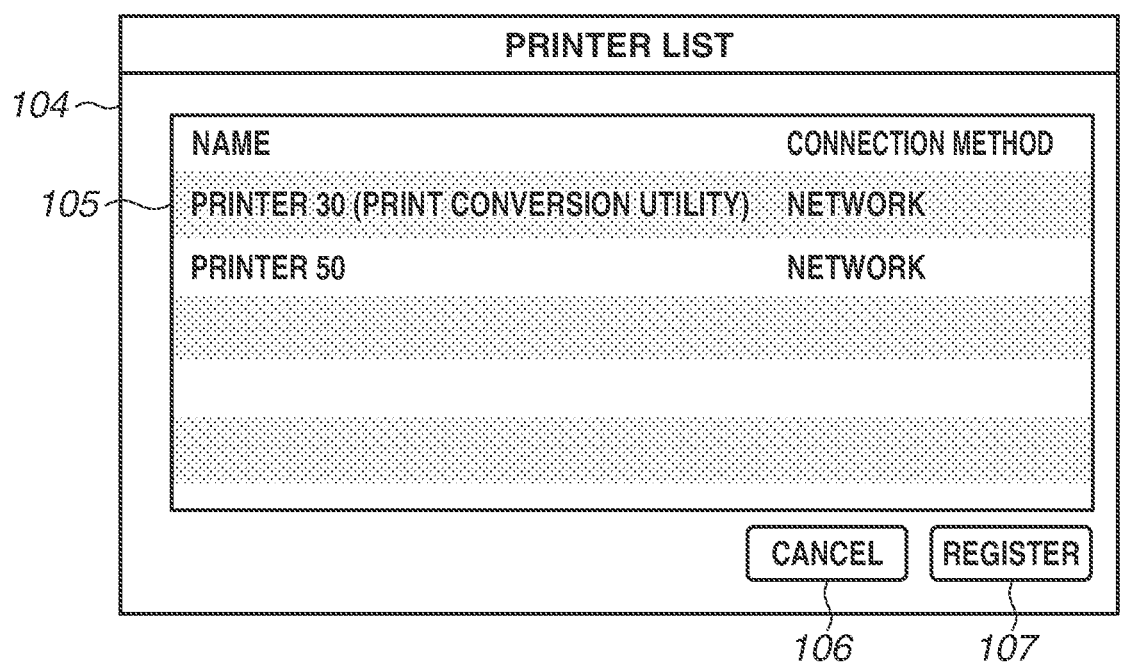

INFORMATION PROCESSING APPARATUS IN WHICH PRINT QUEUE OF PRINTING APPARATUS CAN BE REGISTERED, CONTROL METHOD OF CONTROLLING INFORMATION PROCESSING APPARATUS, AND NON-TRANSITORY COMPUTER-READABLE MEDIUM

CROSS-REFERENCE TO RELATED APPLICATIONS

This application is a Continuation of U.S. patent application Ser. No. 16/950,445, filed Nov. 17, 2020, which claims the benefit of Japanese Patent Application No. 2019-216689, filed Nov. 29, 2019, both of which are hereby incorporated by reference herein in their entirety.

BACKGROUND OF THE INVENTION

Field of the Invention

The present invention relates to an information processing apparatus and a control method.

Description of the Related Art

There is a technique by which an operating system (hereinafter, referred to as "OS") provides a standard print function (hereinafter, referred to as "OS standard print function") without requiring printer-specific software (hereinafter, referred to as "specific printer driver") provided by a printer vendor (refer to Japanese Patent No. 5806783). The OS determines whether the printer supports the OS standard print function based on information acquired from the printer, and if the printer supports the OS standard print function, the OS transmits print data generated by the OS standard print function to the printer.

SUMMARY OF THE INVENTION

The present invention in one aspect provides a method of controlling an information processing apparatus in which a print queue of a printing apparatus may be registered in print control software configured to generate print data in a predetermined format, and may be registered in operating system standard print software configured to generate print data in a different format from the predetermined format, the method comprising: in a case where the print queue of the printing apparatus is registered in the operating system standard print software but is not registered in the print control software, executing a process of registering the print queue of the printing apparatus in print control software configured to generate print data in the predetermined format; and in a case where the print queue of the printing apparatus is registered in the print control software but is not registered in the operating system standard print software, executing a process of registering the print queue of the printing apparatus in operating system standard print software configured to generate print data in the different format from the predetermined format.

Further features of the present invention will become apparent from the following description of exemplary embodiments with reference to the attached drawings.

BRIEF DESCRIPTION OF THE DRAWINGS

FIG. 4 is a schematic view illustrating a printer list screen and a printer registration screen of an operating system (OS) printing system.

DESCRIPTION OF THE EMBODIMENTS

Figure 1:
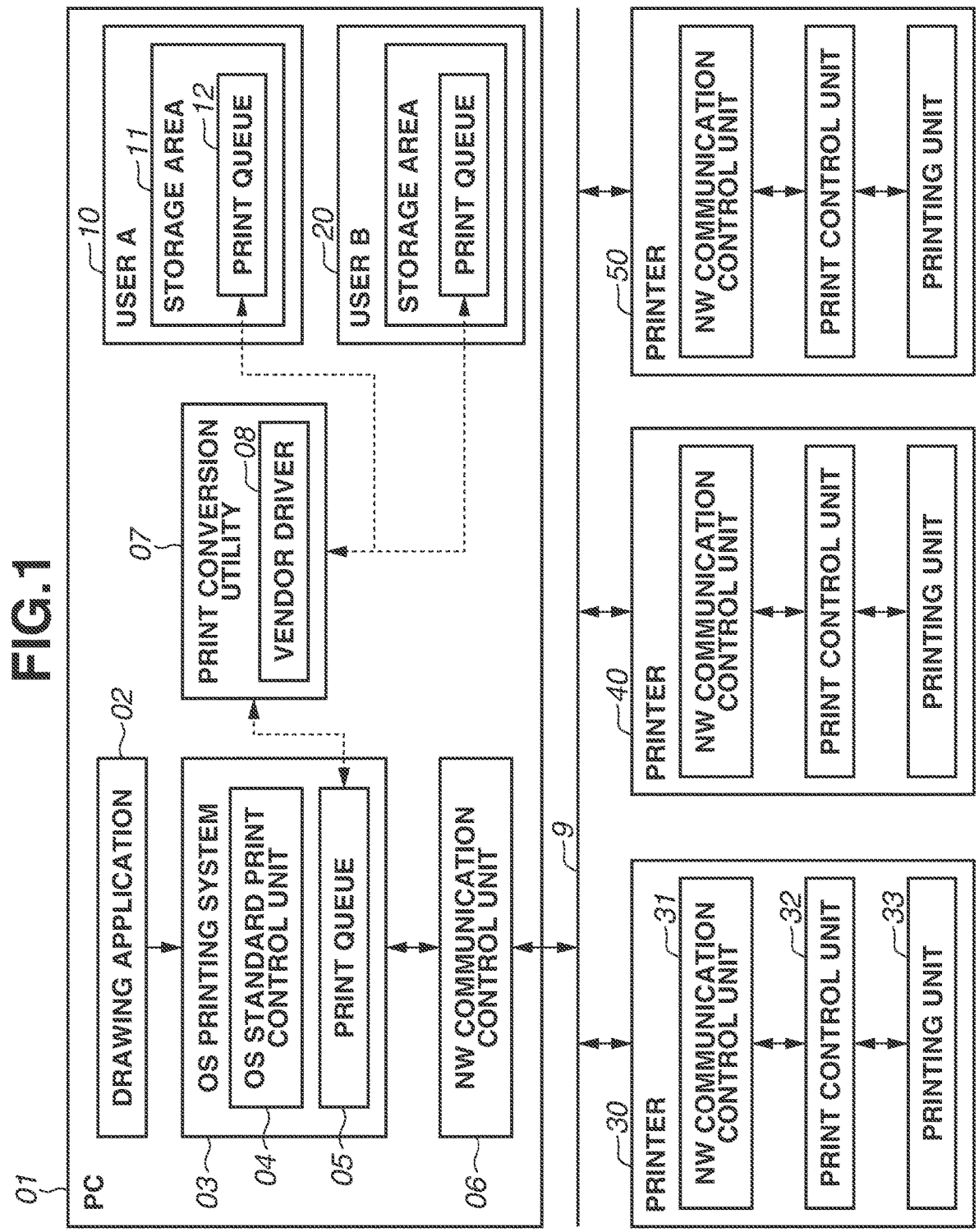
FIG. 1 illustrates an overall configuration of a printing system according to an exemplary embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In a case where a printer does not support an operating system (OS) standard print function, the printer cannot interpret print data generated by the OS standard print function. Further, there are cases where a printer supports the OS standard print function but a user desires to print based on more detailed print settings than the OS standard print function.

Thus, an aspect of the present invention is directed to a technique for issuing an appropriate print instruction using the OS standard print function in at least one of the above-described cases.

First Exemplary Embodiment

FIG. 1 illustrates an overall configuration of a printing system according to a first exemplary embodiment. A personal computer (PC) 01 is connected to printers 30, 40, and 50 via a network 09 and communicates with each other. While the network 09 is a local area network (LAN) in the present exemplary embodiment, a wide area network (WAN) can be employed. Further, a network connection form can be a wired connection, wireless connection, or a combination thereof. The PC 01 controls the printers 30, 40, and 50 connected via the network 09.

<Hardware Configuration>

Figure 16:
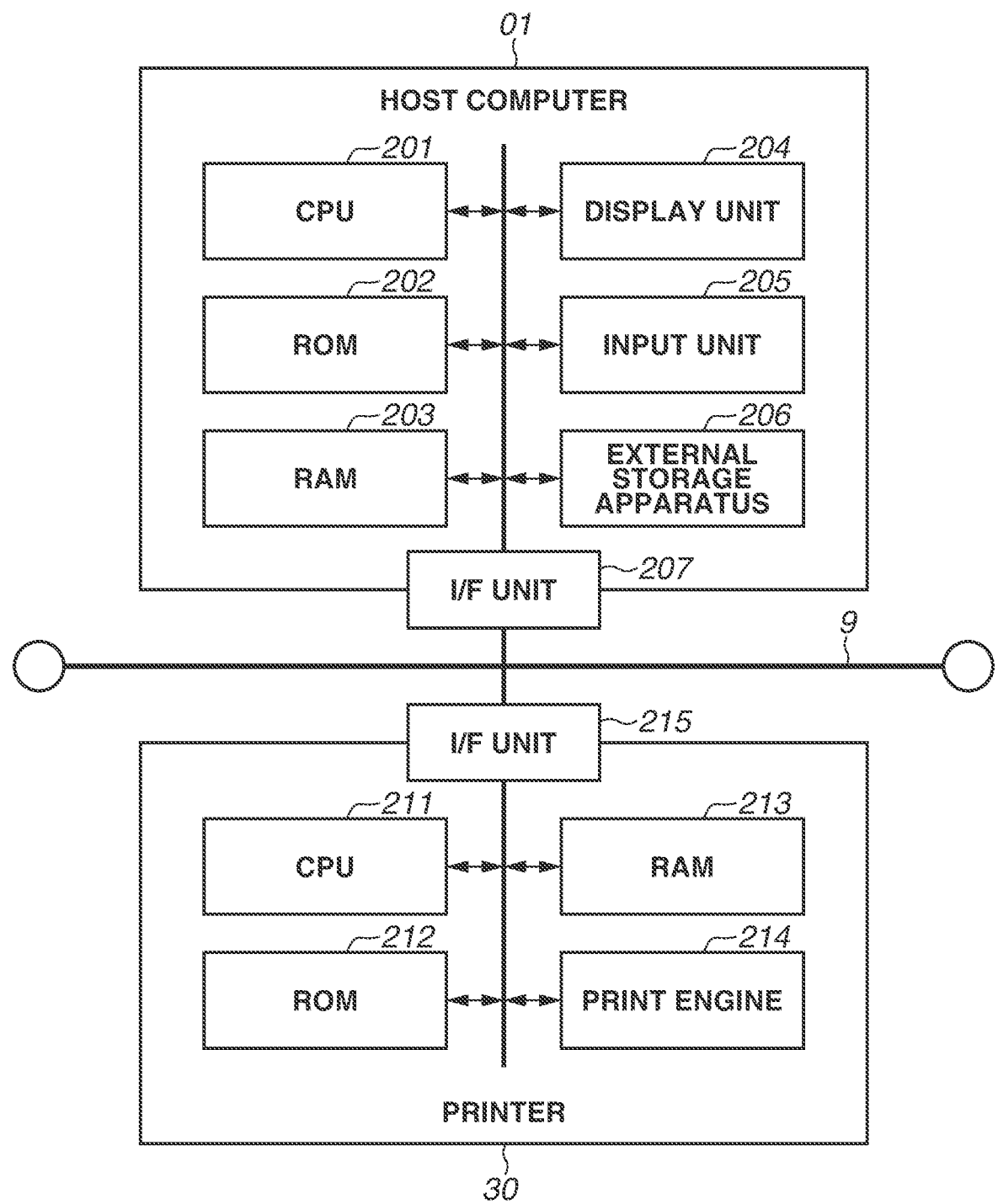
FIG. 16 is a block diagram illustrating a hardware configuration of an information processing apparatus.

A hardware configuration according to the present exemplary embodiment will be described below with reference to a block diagram illustrated in FIG. 16. FIG. 16 illustrates an example of a printing system in which the PC 01 being a host computer and the printer 30 communicate with each other. While FIG. 16 illustrates a hardware configuration of the printer 30, the printers 40 and 50 each have the same or similar hardware configuration.

The PC 01 is an example of an information processing apparatus. The PC 01 is, for example, a PC and includes an interface (I/F) unit 207, a central processing unit (CPU) 201, a read-only memory (ROM) 202, a random access memory (RAM) 203, a display unit 204, an input unit 205, and an external storage apparatus 206. The PC 01 according to the present exemplary embodiment is not limited to a desktop PC and can be a laptop PC, tablet PC, or smartphone.

The PC 01 transmits instructions for controlling the printer 30, print data, and setting commands to the printer 30. The CPU 201 is a central processing unit that controls the components of the PC 01 and executes a control program, such as an OS or a print conversion utility 07 described below. The ROM 202 controls operations of the printing system based on the stored OS. The RAM 203 is a random access memory on which a work area of the CPU 201 is developed. An external storage apparatus 206 stores applications and various control programs including the print conversion utility 07.

The input unit 205 is an input device, such as a keyboard and mouse, for operating the PC 01. The display unit 204 is a display device that displays information input from the input unit 205 for checking, a user interface screen of the OS or application, and a message. The I/F unit 207 is a communication module that transmits and receives data to and from the printer 30.

The printer 30 is a printing apparatus such as an inkjet printer. The printer 30 includes an I/F unit 215, a CPU 211, a ROM 212, a RAM 213, and a print engine 214. The CPU 211 is a central processing apparatus that controls the components described below. The ROM 212 is a read-only memory and stores programs for controlling the print engine 214. The RAM 213 is a random access memory and temporarily stores a program for an operation of the print engine 214 and a setting value received from the PC 01.

The print engine 214 performs printing on a recording medium based on print data transmitted from the PC 01. The I/F unit 215 is a communication module that receives print data from the PC 01 and includes a function of transmitting current status information about the printer 30 from the printer 30 to the PC 01. As used herein, the term "status information" refers to status data that indicates a state of the printer 30 and is returned from the printer 30 in response to a request from the PC 01 connected via the I/F unit 215. The term "status data" refers to information that indicates an operation state of the printer 30, such as "printing in progress" or "standby state", or an error state of the printer 30, such as "out of sheets", "cover opened", or "out of ink".

<Software Configuration of PC 01>

A software configuration of the PC 01 will be described below with reference to FIG. 1 again. The information processing apparatus that is the PC 01 includes a drawing application 02, an OS printing system 03, a network (NW) communication control unit 06, the print conversion utility 07, a storage area 11 for an account 10 of a user A, and a storage area for an account 20 of a user B. While not illustrated in FIG. 1, an OS is embedded in the PC 01, and resources of the PC 01 such as blocks in the PC 01 are managed by the OS. In the present exemplary embodiment, the OS embedded in the PC 01 is macOS®.

The drawing application 02 is software that generates drawing data based on a user instruction. As used herein, the term "application" refers to software that is operable on the OS. The drawing application 02 is, for example, word processor software for creating a document, image editing software, or greeting card creation software. Drawing data generated by the drawing application 02 is, for example, Portable Document Format (PDF) data.

In a case where a print request is issued, the drawing application 02 outputs generated drawing data to the OS printing system 03. If a print request is issued, the OS printing system 03 generates a print job based on the acquired drawing data and print setting information. The generated print job is input to a print queue 05 of the OS standard print function. A user can input the print setting in advance via a setting screen (the setting screen will be described below with reference to FIG. 5) provided by the OS printing system 03. The print setting information includes sheet size information, sheet type information, and information about a print queue to execute printing. The OS printing system 03 sequentially processes print requests from the drawing application 02 as jobs for each printer connected to the PC 01.

The OS printing system 03 is OS standard print software that includes a standard function (the OS standard print function) for generating print data. The OS printing system 03 spools drawing data generated by the drawing application 02 and generates print data in predetermined format (hereinafter, also referred to as "standard format") based on the OS standard print function.

Further, the OS printing system 03 acquires printer model information about a printer via the NW communication control unit 06 to determine whether the printer supports the OS printing system 03. Information to be acquired for the support determination is not limited to the printer model information and can be printer capability information. Various types of processing performed by the OS printing system 03 are controlled by an OS standard print control unit 04 in the OS printing system 03.

The print conversion utility 07 is print control software that allows the use of a printer that does not support the OS standard print function. The print conversion utility 07 is installed in the PC 01 as needed. The print conversion utility 07 includes a function of converting print data in standard format into print data in printer vendor-specific format. Hereinafter, this function will be referred to as "vendor driver 08", but the function of the vendor driver 08 does not have to be equivalent to a function of a conventional specific printer driver, and the vendor driver 08 is to include at least a function of converting print data into print data in printer vendor-specific format. In a case where a printer does not support the OS standard print function, the print conversion utility 07 converts print data into print data in vendor-specific format and then the converted print data is transmitted to the printer via the NW communication control unit 06.

The print conversion utility 07 includes a function as a virtual printer. A print job for a printer that does not support the OS standard print function is output to the virtual printer by the OS printing system 03. Then, the vendor driver 08 in the print conversion utility 07 converts print data in standard format into print data in printer vendor-specific format. On the other hand, as to a print job for a printer that supports the OS standard print function, the OS printing system 03 transmits print data in standard format as generated to the printer via the NW communication control unit 06.

In a case where a printer that does not support the OS standard print function receives print data in standard format generated by the OS printing system 03, the printer cannot interpret the print data. Thus, in the present exemplary embodiment, the print conversion utility 07 converts print data in standard format into print data in printer vendor-specific format that can be interpreted by the printer. Consequently, a printer that does not support the OS standard print function can perform printing using the standard function of the OS printing system 03.

Even in a case where a printer supports the OS printing system 03 (i.e., a case where the printer can interpret print data in standard format), the print conversion utility 07 can be used for a print instruction with respect to a printer that supports the print conversion utility 07. Use of the print conversion utility 07 provides more functions. For example, the OS standard print function provided by the OS printing system 03 does not support detailed print quality such as color matching processing and hue/brightness adjustment. That is to say, the OS standard print function has limitations. Thus, the print conversion utility 07 is used to provide functions equivalent to those of the printer vendor-specific printer driver.

To use the print conversion utility 07 from the drawing application 02, the print queue 05 in the OS printing system 03 for receiving a print request from the drawing application 02 and a print queue 12 are both registered in the print conversion utility 07. For example, in a case where the user A logs in to the PC 01, the print queue 05 in the OS printing system 03 and a print queue 12 are both registered in the print conversion utility 07. Unless both of the print queues 05 and 12 are registered, print data cannot be converted using the print conversion utility 07 from the drawing application 02. If the print queue 12 of the print conversion utility 07 is registered, the print queue 05 of the OS printing system 03 is also registered automatically.

The print queue 12 of the print conversion utility 07 is stored in a storage area for each user. Specifically, the print queue 12 of the print conversion utility 07 for the user A and a print queue of the print conversion utility 07 for the user B are respectively registered in different storage areas. On the contrary, the print queue 05 of the OS printing system 03 is stored in a shared area in the OS printing system 03. Specifically, the print queue 05 of the OS printing system 03 is shared by users A and B. Hereinafter, the print queue 05 of the OS printing system 03 is sometimes referred to as "the print queue 05 of the OS standard print function".

<Software Configuration of Printers>

The printers 30, 40, and 50 each include a NW communication control unit 31, a print control unit 32, and a printing unit 33. The print control unit 32 receives print data from the PC 01 via the NW communication control unit 31 and executes printing based on the print data by controlling the printing unit 33. In the present exemplary embodiment, the printers 30 and 40 do not support the OS standard print function whereas the printer 50 supports the OS standard print function. The printers 30, 40, and 50 can be an inkjet printing apparatus or an electrophotographic printing apparatus.

<Registration of Print Queue in Print Conversion Utility>

Figure 2:
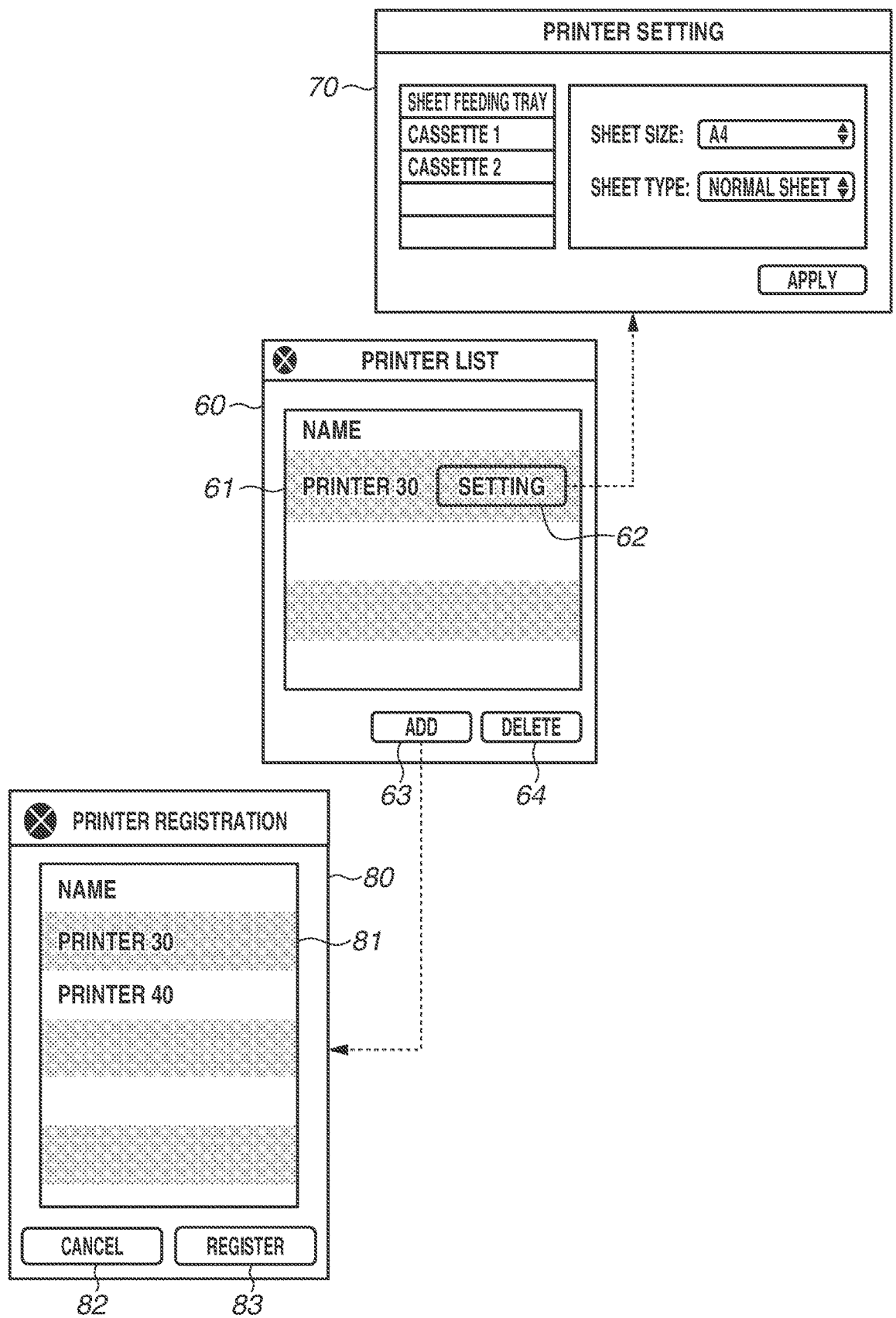
FIG. 2 is a schematic view illustrating a printer list screen, a printer registration screen, and a printer setting screen of a print conversion utility.

Next, changes of a displayed screen on the PC 01 will be described below to illustrate a process of registration in the print queue 12 of the print conversion utility 07. FIG. 2 illustrates a printer list screen 60 provided by the print conversion utility 07. The printer list screen 60 is a screen that displays a list of printers with print queues registered in the print conversion utility 07. The printer list screen 60 includes a name 61 of each printer registered in the print conversion utility 07, a "SETTING" button 62 for setting a printer setting, an "ADD" button 63 for registering a printer, and a "DELETE" button 64 for deleting a printer. In FIG. 2, the printer 30 is registered in the print conversion utility 07. Accordingly, this indicates that a print queue of the printer is registered in the print conversion utility 07.

If a user selects the "SETTING" button 62, the print conversion utility 07 opens a printer setting screen 70. If the "ADD" button 63 is clicked, the print conversion utility 07 opens a printer registration screen 80.

The printer registration screen 80 includes a printer list 81, a "CANCEL" button 82, and a "REGISTER" button 83. The printer list 81 displays every printer that is connected to the PC 01 and does not support the OS standard print function. In the case of the configuration illustrated in FIG. 1, the printers 30 and 40, which do not support the OS standard print function, are displayed on the printer list 81. In FIG. 2, the printer 30 is registered in the print conversion utility 07 whereas the printer 40 is not yet registered in the print conversion utility 07.

If a user selects the printer 40 and presses the "REGISTER" button 83 on the printer registration screen 80, the printer 40 selected in the printer list 81 is registered in the print conversion utility 07. Specifically, a print queue of the printer 40 is registered in the print conversion utility 07. If a printer is registered in the print conversion utility 07, the print conversion utility 07 starts responding to the OS printing system 03 with internally-generated information about whether the OS standard print function is supported based on information about the registered printer. Examples of information about the registered printer include a model name, printer name, and printer installation location information. Examples of internally-generated information about whether the OS standard print function is supported include a universally unique identifier (UUID) and capability information. At this time, the print conversion utility 07 executes a registration command to register the print queue of the printer 40 in the OS printing system 03 based on information (model name, printer name, printer installation location information, UUID, capability information) about the printer responding to the OS printing system 03. Specifically, the print conversion utility 07 instructs the OS printing system 03 to register the print queue. By the above-described processing, the print queue is automatically registered in the OS printing system 03 when a user executes registration of the print queue in the print conversion utility 07.

If the "DELETE" button 64 is clicked with the printer 30 being selected on the printer list screen 60 in FIG. 2, the print queue 12 of the printer 30 being selected in the print conversion utility 07 is deleted from the print conversion utility 07. Furthermore, the print conversion utility 07 executes a DELETE command on the print queue 05 of the OS standard print function that is associated with the print queue 12 in the print conversion utility 07. Specifically, the print conversion utility 07 instructs the OS printing system 03 to delete the print queue 05. Consequently, the print queue 05 of the OS standard print function is automatically deleted. Specifically, in a case where a print queue of a printer is deleted from the print conversion utility 07, the print queue of the printer is also deleted from the OS printing system 03 without a user operation on a screen of the OS printing system 03. In the present exemplary embodiment, registration and deletion in and from the print queue 05 of the OS standard print function can be executed manually from the OS printing system 03. Details thereof will be described below with reference to FIG. 3.

<Preferences Screen>

Figure 3:
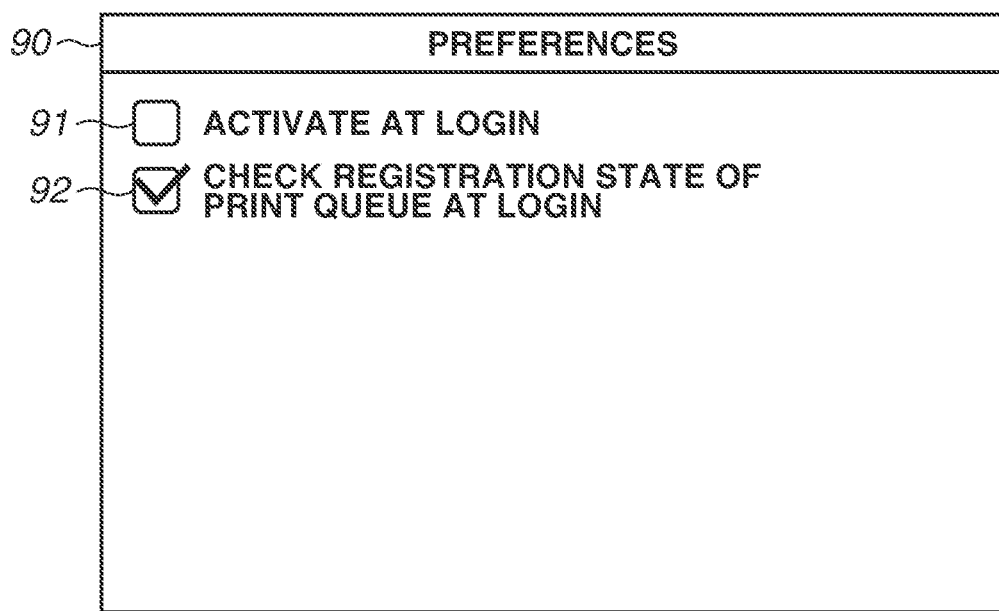
FIG. 3 is a schematic view illustrating a preferences screen of the print conversion utility.

FIG. 3 illustrates a preferences screen 90 provided by the print conversion utility 07. The preferences screen 90 includes an "ACTIVATE AT LOGIN" checkbox 91 and a "CHECK REGISTRATION STATE OF PRINT QUEUE AT LOGIN" checkbox 92 as preferences items. If a user clicks the "ACTIVATE AT LOGIN" checkbox 91, the print conversion utility 07 is automatically activated when the user logs in to the PC 01. On the other hand, if the user clicks the "CHECK REGISTRATION STATE OF PRINT QUEUE AT LOGIN" checkbox 92, a process of checking a registration state of the print queue 05 of the OS standard print function and the print queue 12 of the print conversion utility 07 that are registered in the PC 01 is performed. Details of the process will be described below with reference to FIG. 7. The setting result (setting value) in FIG. 3 is stored in a storage area for the user.

<Process of Manual Registration of Print Queue in OS Printing System>

A print queue is automatically registered in the OS printing system 03 in a case where the print queue is registered in the print conversion utility 07 as described above with reference to FIG. 2. It is also possible to manually register a print queue in the OS printing system 03 on a screen provided by the OS printing system 03. A process thereof will be described below with reference to FIG. 4.

FIG. 4 illustrates a printer list screen 100 provided by the OS printing system 03. In FIG. 4, the printer list screen 100 includes a printable printer list 101 displaying all printers that are selectable in printing. The printable printer list 101 displays printers with a print queue registered in the OS printing system 03. If a user selects a printer from the printable printer list 101 and clicks a "DELETE" button 103 on the printer list screen 100, the OS printing system 03 deletes the print queue of the selected printer. The OS printing system 03 also deletes the printer from the printable printer list 101.

If a user clicks an "ADD" button 102 on the printer list screen 100, the OS printing system 03 displays a printer registration screen 104. A printer list 105 of the printer registration screen 104 displays all printers that are connected to the PC 01 and support the OS standard print function. Even in a case where a printer does not support the OS standard print function, if the printer is registered in the print conversion utility 07, it is considered that the printer virtually supports the OS standard print function, so that the printer is displayed on the printer list 105 of the printer registration screen 104.

Details of a process of displaying the printer list 105 will be described below. The OS printing system 03 acquires a name of the printer 50 and capability information from the printer 50 connected to the PC 01 and supporting the OS standard print function. The capability information includes information about whether the printer 50 supports the OS standard print function. Then, the name and connection method of each printer that supports the OS standard print function are displayed on the printer list 105. Further, the OS printing system 03 acquires capability information about each printer registered in the print conversion utility 07 from the print conversion utility 07. Since the printer 30 does not support the OS standard print function and is registered in the print conversion utility 07, the printer 30 is an operation target of the print conversion utility 07. Thus, the print conversion utility 07 adds the term "print conversion utility" to the name acquired from the printer 30 and transmits the name with the term "print conversion utility" to the OS printing system 03. Consequently, the OS printing system 03 displays "printer 30 (print conversion utility)" as the name of the printer 30 and "Network" as the connection method of the printer 30 on the printer list 105 based on the capability information acquired from the print conversion utility 07.

In a case where a printer with a print queue that is not registered in the OS standard print function is displayed on the printer list 105 on the printer registration screen 104 and a user selects the printer and clicks a "REGISTER" button 107, the selected printer is registered. Specifically, the OS printing system 03 generates a new print queue 05 of the OS standard print function for the selected printer. Then, the OS printing system 03 displays the selected printer on the printable printer list 101 and closes the printer registration screen 104. If a user clicks a "CANCEL" button 106 on the printer registration screen 104, the OS printing system 03 closes the printer registration screen 104 without registering a new printer. In the present exemplary embodiment, the printer 30, which virtually supports the OS standard print function via the print conversion utility 07, and the printer 50, which supports the OS standard print function, are registered in the print queue 05 of the OS standard print function.

<Print Setting Screen>

Figure 5:
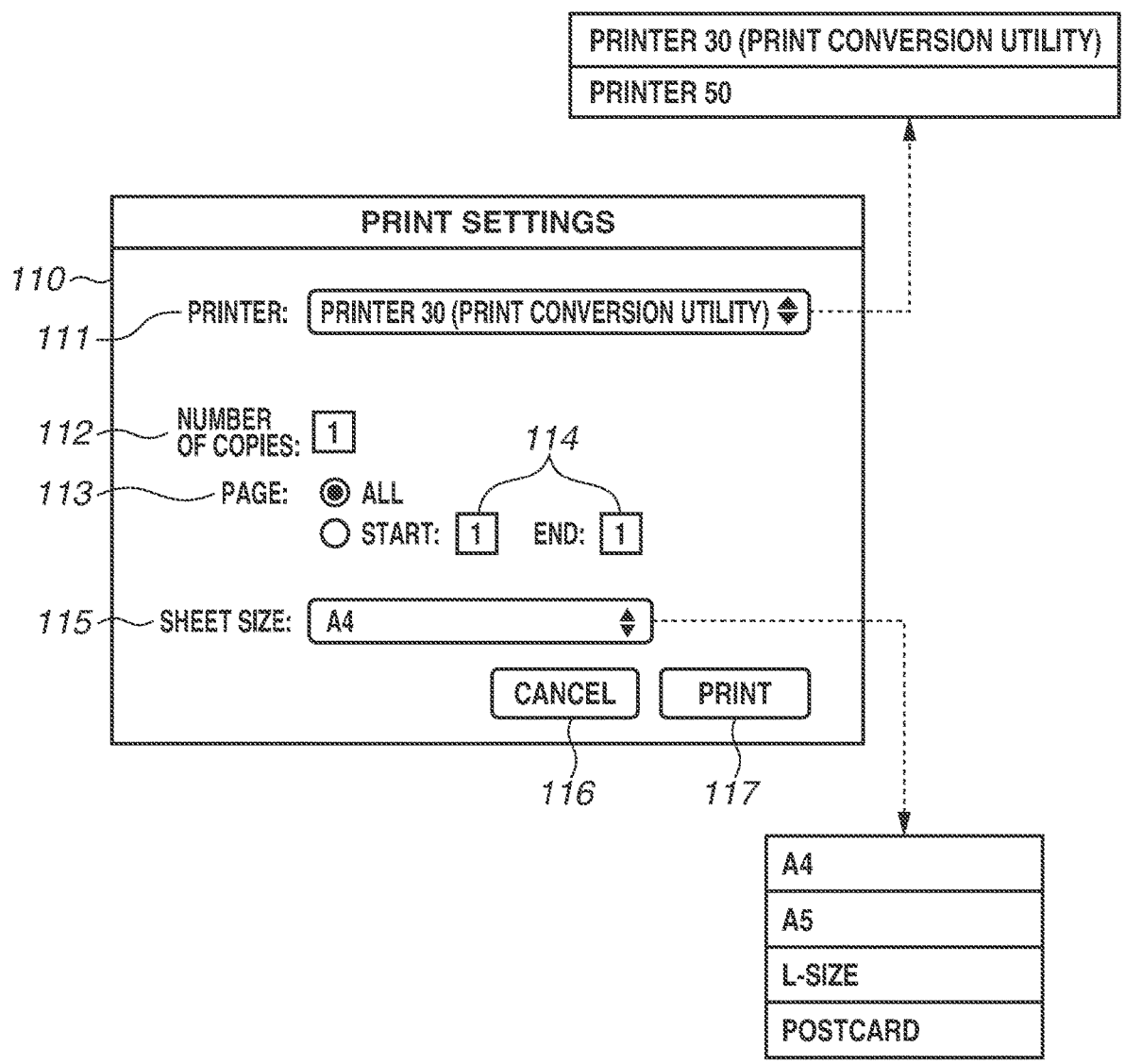
FIG. 5 is a schematic view illustrating a print setting screen of the OS printing system.

FIG. 5 is a schematic view illustrating a print setting screen 110 provided by the OS printing system 03. The print setting screen 110 is a screen via which a user sets a print setting for printing data generated by the drawing application 02.

The user can set a printer that is to perform printing via a printer selection pop-up menu 111. The OS printing system 03 displays the printable printers that are added as selectable printers on the printer list screen 100 in FIG. 4 on the printer selection pop-up menu 111. In the present exemplary embodiment, the printer 30, which supports the OS standard print function via the print conversion utility 07, and the printer 50, which supports the OS standard print function, are registered as printable printers. Therefore, the printers 30 and 50 are displayed on the printer selection pop-up menu 111.

The user can set the number of copies via a number-of-copies setting text field 112. The user can set a page to print via a page setting radio button 113 and a page designation text field 114. The user can set the size of a sheet to print via a sheet size setting pop-up menu 115. For example, the user can set one of the printer-printable sheet sizes A4, A5, L-size, and postcard. If the user clicks a "PRINT" button 117, the OS printing system 03 inputs a print job based on the settings set via the screen and closes the screen. If a user clicks a "CANCEL" button 116, the OS printing system 03 closes the screen without inputting a print job.

<System Menu Screen of OS>

Figure 6:
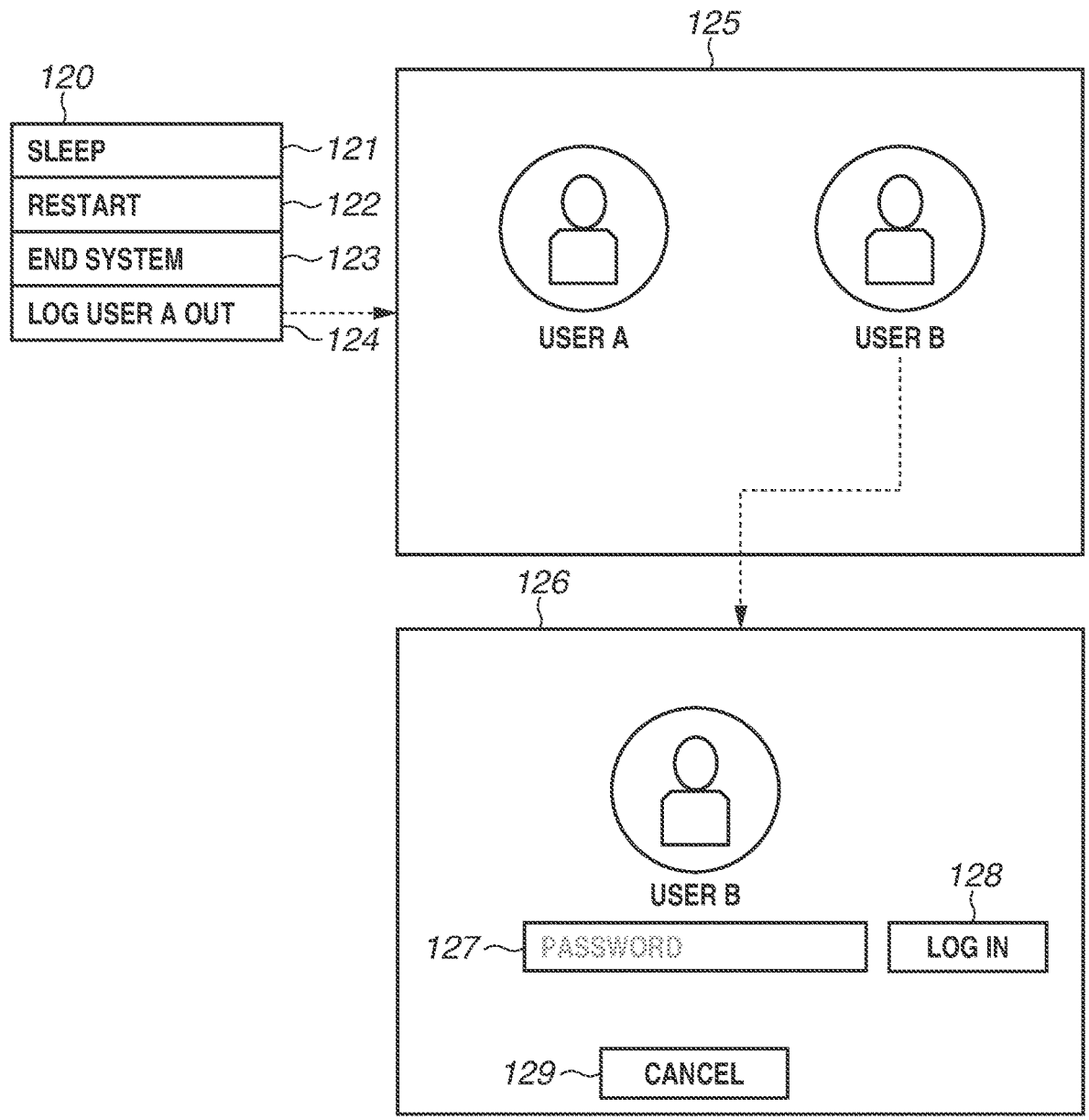
FIG. 6 is a schematic view illustrating a system menu screen of an OS.

FIG. 6 is a schematic view illustrating a system menu screen of the OS of the PC 01. The system menu screen of the OS displays a list of processes that are executable on the OS on a menu list 120. If the user clicks a "SLEEP" button 121, the PC 01 is changed to a sleep mode. In a case where the PC 01 is changed to the sleep mode, the print conversion utility 07 stops operating and the print queue 05 of the OS standard print function can no longer be used. If the user clicks a "RESTART" button 122, the PC 01 is restarted.

During the restart, the print conversion utility 07 stops operating and the print queue 05 of the OS standard print function cannot be used. If the user clicks an "END SYSTEM" button 123, the PC 01 is shut down, the print conversion utility 07 stops operating, and the print queue 05 of the OS standard print function can no longer be used. If the user clicks a "LOG OUT" button 124, the currently logged-in user is logged out. A case where the user A in a logged-in state is logged out is described herein. After the logout, a user selection screen 125 is displayed.

The user selection screen 125 displays a list of users registered in the PC 01. In the present exemplary embodiment, the account 10 of the user A and the account 20 of the user B are registered in the PC 01. If a user is selected on the user selection screen 125, a login screen 126 of the selected user is displayed. For example, in a case where the account 20 of the user B is selected, if a login password is input to a password input region 127 of the login screen 126 for the account 20 of the user B and a "LOG IN" button 128 is clicked, the user B is logged in to the PC 01. If a "CANCEL" button 129 is clicked, the user selection screen 125 is displayed.

A case where the account 10 of the user A previously logs in and the print queue 12 of the print conversion utility 07 and the print queue 05 of the OS standard print function are registered for the printer 30 will be described below. In this case, the print queue 12 of the print conversion utility 07 is stored in the storage area 11 of the account 10 of the user A, whereas the print queue 05 of the OS standard print function is stored in the shared area in the OS printing system 03. Thereafter, the account 10 of the user A logs out, and the account 20 of the user B logs in for the first time. In this case, since the account 20 of the user B does not have the print queue 12 of the printer 30 registered in the print conversion utility 07, printing is not executed by designating the print queue 05 of the printer 30 in the OS standard print function that is registered by the user A in the shared area in the OS printing system 03. An example of a process by which the user B can execute printing using the printer 30 in the above-described case will be described below.

<Process of Print Conversion Utility 07>

Figure 7:
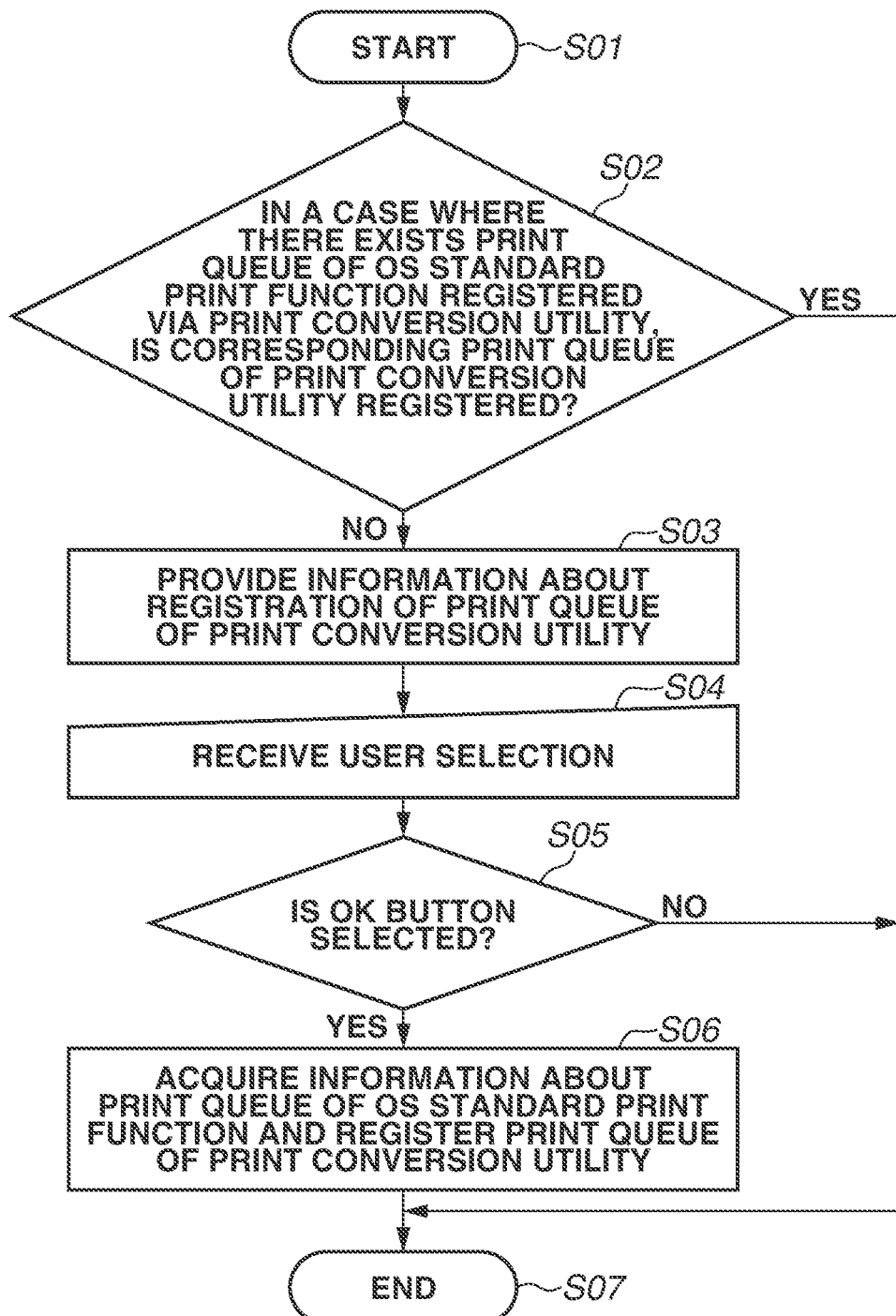
FIG. 7 is a schematic view illustrating a process of activating the print conversion utility.

FIG. 7 is a flowchart illustrating a process of activating the print conversion utility 07. The process in FIG. 7 is started if the user B activates the print conversion utility 07, and the processing proceeds to step S01. While the print conversion utility 07 will be described below as an executor of each process, a corresponding function is realized by execution of a corresponding program by the CPU 201. The entire operations are not always executed sequentially on a single process, and there may be a case where the process is moved to the OS and then returned from the OS. The flowchart illustrates major operations of the print conversion utility 07 for convenience and ease of understanding.

In step S02, the print conversion utility 07 determines whether there is a printer that has the print queue 05 of the OS standard print function registered but that does not have the print queue 12 of the print conversion utility 07 registered. In other words, the print conversion utility 07 determines whether there is a printer that has the print queue 05 of the OS standard print function registered but that does not have the print queue 12 corresponding to the print queue 05 registered in the print conversion utility 07. Specifically, for example, information (e.g., model name) about printers registered in the OS printing system 03 is acquired, and whether the acquired model names are registered in the print conversion utility 07 is determined. In a case where the print conversion utility 07 determines that there is a printer that has the print queue 05 of the OS standard print function registered but that does not have the print queue 12 of the print conversion utility 07 registered (NO in step S02), the processing proceeds to step S03. On the other hand, in a case where it is determined YES in step S02, the processing proceeds to step S07, and the process is ended.

Figure 8:
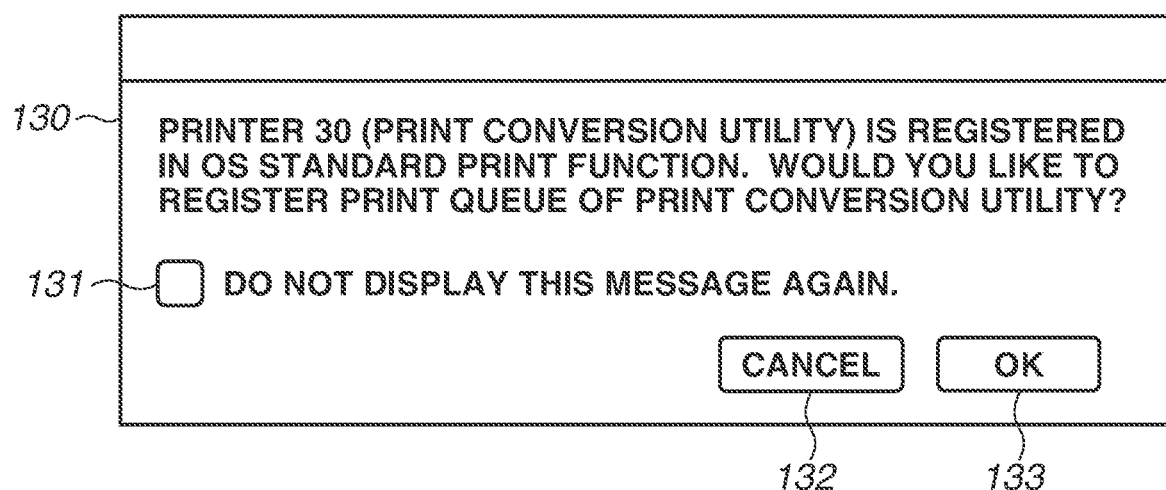
FIG. 8 is a schematic view illustrating a print queue registration guide dialog.

In step S03, the print conversion utility 07 provides a confirmation screen that prompts a user to confirm whether to register the print queue 12 of the print conversion utility 07. FIG. 8 illustrates a print queue registration dialog 130 provided by the print conversion utility 07 as an example of the confirmation screen.

In step S04, the print conversion utility 07 receives user selection on the print queue registration dialog 130. If a "DO NOT DISPLAY THIS MESSAGE AGAIN." checkbox is selected on the print queue registration dialog 130 by a user, the print conversion utility 07 does not display the dialog thereafter for that the user. Specifically, thereafter, steps S03 to S05 are skipped and step S06 is executed in the case where the print conversion utility 07 determines NO in step S02 in the process illustrated in the flowchart in FIG. 7. Further, the "CHECK REGISTRATION STATE OF PRINT QUEUE AT LOGIN" checkbox 92 on the preferences screen 90 in FIG. 3 is unselected. For re-displaying, the preferences screen 90 in FIG. 3 is opened and the "CHECK REGISTRATION STATE OF PRINT QUEUE AT LOGIN" checkbox 92 is selected.

In step S05, the print conversion utility 07 determines whether an "OK" button 133 is selected on the print queue registration dialog 130. In a case where the "OK" button 133 is not selected (NO in step S05), the print conversion utility 07 determines that the print queue 12 of the print conversion utility 07 is not to be registered, and the processing proceeds to step S07 and the process is ended. On the other hand, in a case where the print conversion utility 07 determines that the "OK" button 133 is selected on the print queue registration dialog 130 (YES in step S05), the print conversion utility 07 determines that the print queue 12 of the print conversion utility 07 is to be registered, and the processing proceeds to step S06.

In step S06, the print conversion utility 07 registers the print queue 12 of the print conversion utility 07 using a device name (corresponding to a virtual printer name acquired from a model information file of the print queue 05 of the OS standard print function) acquired from the print queue 05 of the OS standard print function.

As described above, in the present exemplary embodiment, the corresponding print queue is registered in the print conversion utility 07 by referring to the print queue 05 of the OS standard print function. Thus, in a case where the account 10 of the user A registers the print queue 05 of the OS standard print function for the printer 30 via the print conversion utility 07, the print queue 12 of the print conversion utility 07 for the printer 30 is registered in the storage area of the account 20 of the user B. Therefore, the account 20 of the user B can execute printing with the printer 30 using the print conversion utility 07.

The present exemplary embodiment is not limited to the cases of multi-user login environments. The present exemplary embodiment is also applicable to, for example, a case where the user A registers both the print queue 12 of the print conversion utility 07 and the print queue 05 of the OS standard print function and thereafter deletes only the print queue 12 of the print conversion utility 07. Specifically, the present exemplary embodiment is also applicable to a case where the user A deletes the print queue 12 of the print conversion utility 07 and logs out while the print queue 05 of the OS standard print function remains and thereafter the user A reactivates the print conversion utility 07. In this case, the user A activates the print conversion utility 07 and the process illustrated in the flowchart in FIG. 7 is executed so that the print queue 12 of the print conversion utility 07 is registered again in the storage area of the account 20 of the user A.

Second Exemplary Embodiment

Next, a second exemplary embodiment of the present invention will be described below. Redundant descriptions of similarities to the first exemplary embodiment are omitted, and mainly differences will be described below. In the first exemplary embodiment, in a case where there is a plurality of print queues 05 of the OS standard print function that is registered via the print conversion utility 07, all the corresponding print queues are registered in the print conversion utility 07 regardless of the need of the user. In the second exemplary embodiment, in the case where there is a plurality of print queues 05 of the OS standard print function that is registered via the print conversion utility 07, a user can select a printer to be registered as the print queue 12 of the print conversion utility 07.

Figure 9:
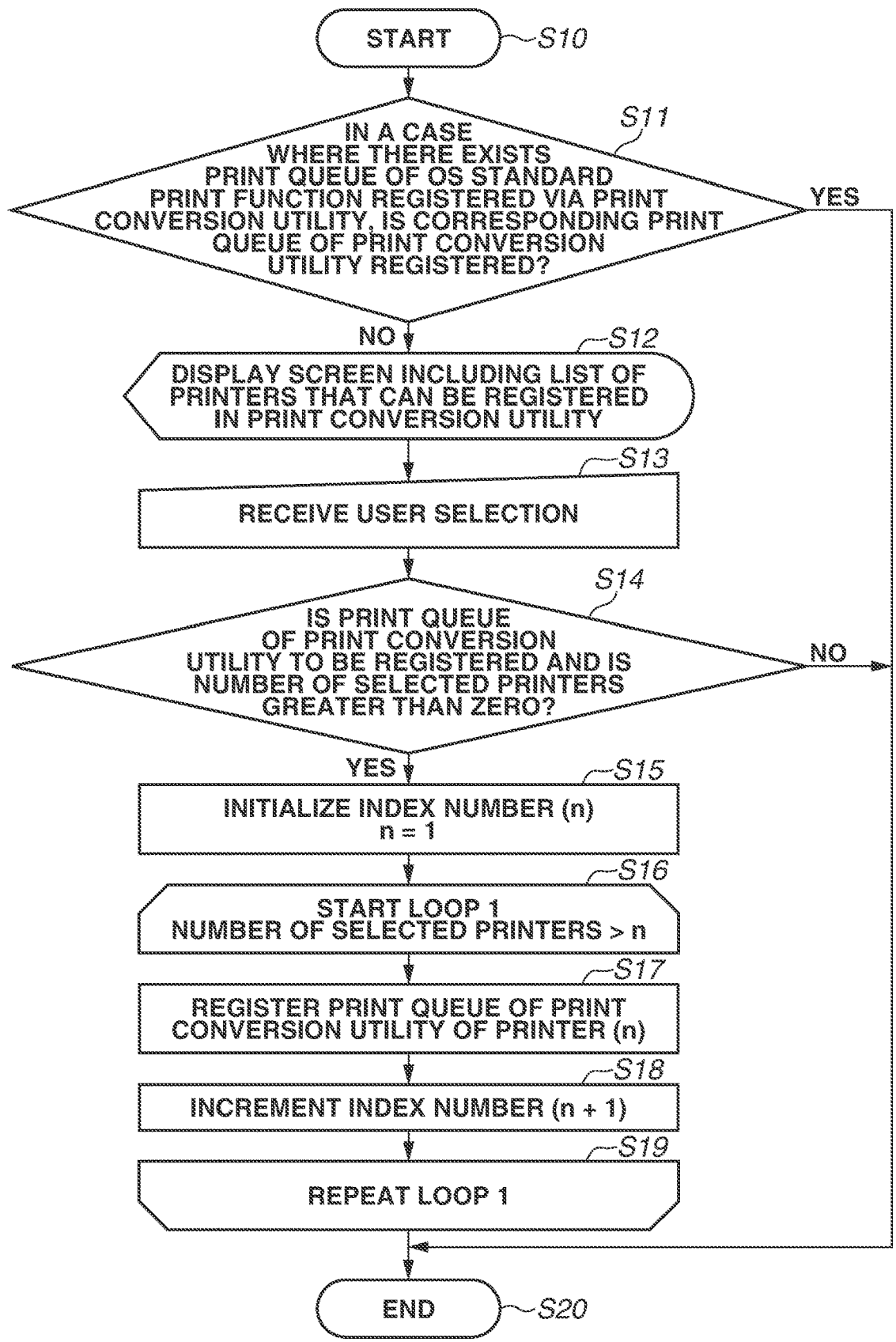
FIG. 9 is a flowchart illustrating a process of activating the print conversion utility.

FIG. 9 is a flowchart illustrating a process of activating the print conversion utility 07 according to the present exemplary embodiment. If the user B activates the print conversion utility 07, the process in FIG. 9 is started, and the processing proceeds to step S10. While the print conversion utility 07 will be described below as an executor of each process, a corresponding function is realized by execution of a corresponding program by the CPU 201. The entire operations are not always executed sequentially on a single process, and there may be a case where the process is moved to the OS and then returned from the OS. The flowchart illustrates major operations of the print conversion utility 07 for convenience and ease of understanding.

In step S11, the print conversion utility 07 determines whether there is a printer that has the print queue 05 of the OS standard print function registered but that does not have the print queue 12 of the print conversion utility 07 registered. Specifically, the print conversion utility 07 determines whether there is a printer that has the print queue 05 registered in the OS standard print function but that does not have the corresponding print queue 12 registered in the print conversion utility 07. Specifically, for example, the print conversion utility 07 acquires information (e.g., model name) about printers registered in the OS printing system 03 and determines whether the acquired model names are registered in the print conversion utility 07. In step S11, in a case where the print conversion utility 07 determines that there is a printer that the print queue 05 of the OS standard print function is registered but the print queue 12 of the print conversion utility 07 is not registered (NO in step S11), the processing proceeds to step S12. On the other hand, in a case where it is determined YES in step S11, the processing proceeds to step S20, and the process is ended.

Figure 10:
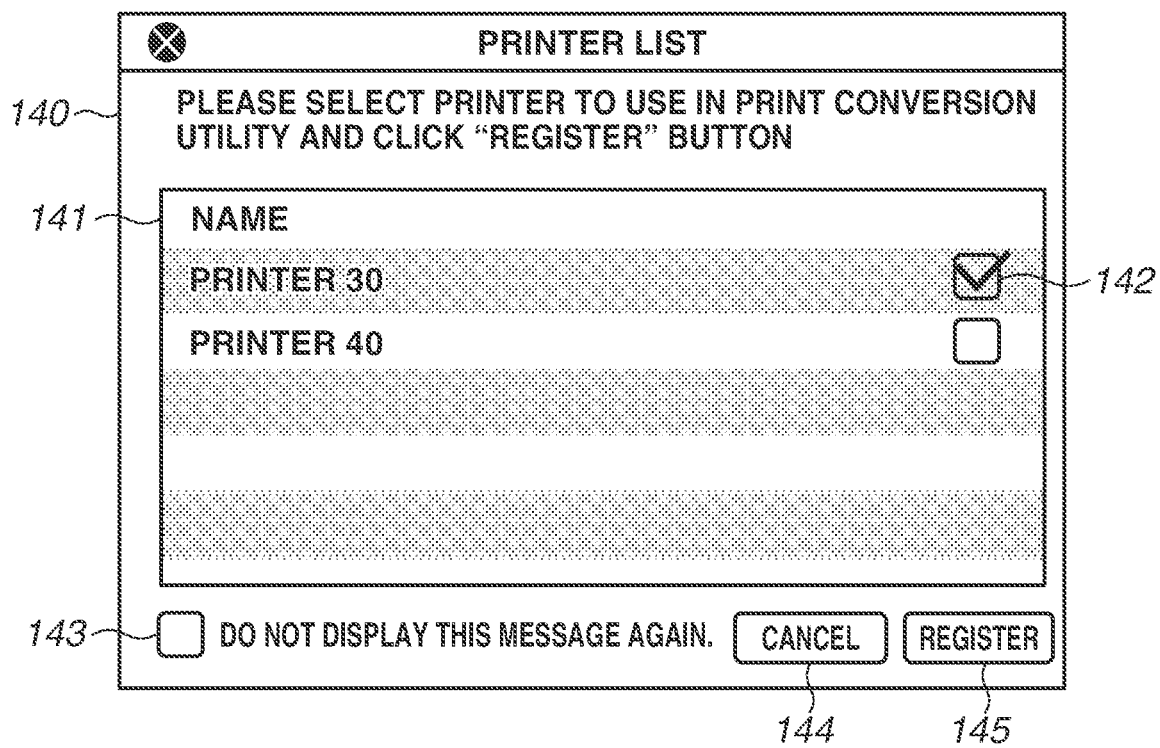
FIG. 10 is a schematic view illustrating a list of printers that can be registered in a print queue of the print conversion utility.

In step S12, the print conversion utility 07 provides a selection screen 140 that prompts a user to select a printer for which the print queue 12 is to be registered in the print conversion utility 07. In the present exemplary embodiment, the selection screen 140 including a printer list 141 as illustrated in FIG. 10 is displayed. The printer list 141 displays a list of printers with the print queue 05 of the OS standard print function registered via the print conversion utility 07.

In step S13, the print conversion utility 07 receives user selection on the printer list 141 in FIG. 10. If a user selects a checkbox 142 of a printer to be registered in the print conversion utility 07 on the printer list 141 and clicks a "REGISTER" button 145, the printer is selected as a registration target. In the present exemplary embodiment, a plurality of printers is selectable.

If a "DO NOT DISPLAY THIS MESSAGE AGAIN." checkbox 143 is selected by a user on the selection screen 140 in FIG. 10, the print conversion utility 07 does not display the dialog thereafter for that user. Specifically, steps S12 to S14 are skipped and steps S15 to S19 are executed in the case where the print conversion utility 07 determines that there is a printer that has the print queue 05 of the OS standard print function registered but that does not have the print queue 12 of the print conversion utility 07 is not registered (NO in step S11). Further, the "CHECK REGISTRATION STATE OF PRINT QUEUE AT LOGIN" checkbox 92 on the preferences screen 90 in FIG. 3 is unselected. For re-displaying, the preferences screen 90 in FIG. 3 is opened and the "CHECK REGISTRATION STATE OF PRINT QUEUE AT LOGIN" checkbox 92 is selected.

In step S14, the print conversion utility 07 determines whether there is one or more print queues to be registered in the print conversion utility 07. Specifically, in a case where a user selects one or more printers on the selection screen 140 in FIG. 10, the print conversion utility 07 determines that there is one or more print queues to be registered in the print conversion utility 07 (YES in step S14). On the other hand, in a case where the user clicks a "CANCEL" button 144 on the selection screen 140 in FIG. 10, there is not a print queue to be registered in the print conversion utility 07 (NO in step S14), so that the processing proceeds to step S20, and the process is ended.

In step S15, the print conversion utility 07 initializes an index number (n=1).

In step S16, the print conversion utility 07 starts loops corresponding to the number of selected printers.

In step S17, the print conversion utility 07 acquires a device name from the print queue 05 of the OS standard print function of the nth printer and registers the print queue 12 of the print conversion utility 07.

In step S18, the print conversion utility 07 increments the index number (n+1).

In step S19, the print conversion utility 07 repeats processing a number of times corresponding to the number of selected printers. Consequently, the print queues 12 of the printers selected by the user are registered in the print conversion utility 07.

As described above, in the present exemplary embodiment, in the case where there is a plurality of print queues 05 of the OS standard print function that is registered via the print conversion utility 07, the user is notified of a list of the registered print queues 05 so that the user can select a printer to be registered in the print conversion utility 07. Thus, the user can register only the print queue 12 of the print conversion utility 07 that the user desires, and the user can execute printing using the print conversion utility 07.

The present exemplary embodiment is not limited to the cases of multi-user login environments. The present exemplary embodiment is also applicable to, for example, a case where the user A first registers the print queues 12 of the print conversion utility 07 and the print queues 05 of the OS standard print function that correspond to a plurality of printers and thereafter the user A deletes only the print queues 12 of the print conversion utility 07. Specifically, the present exemplary embodiment is also applicable to a case where the user A deletes all the print queues 12 of the print conversion utility 07 and logs out while all the print queues 05 of the OS standard print function remain and thereafter the user A re-activates the print conversion utility 07. In this case, the user A activates the print conversion utility 07 and the process illustrated in the flowchart in FIG. 9 is executed to thereby register the desired print queue(s) 12 of the print conversion utility 07 in the storage area of the account 20 of the user A.

Third Exemplary Embodiment

Next, a third exemplary embodiment of the present invention will be described below. Redundant descriptions of similarities to the first or second exemplary embodiment are omitted, and only differences will be described below. In the first and second exemplary embodiments, the processes of registering the print queue 12 of the print conversion utility 07 in the case where the print queue 05 of the OS standard print function is registered but the print queue 12 of the print conversion utility 07 is not registered are described. In the third exemplary embodiment, a process of registering the print queue 05 of the OS standard print function in a case where the print queue 12 of the print conversion utility 07 is registered but the print queue 05 of the OS standard print function is not registered will be described below.

Hereinafter, first, the print queue 05 of the OS standard print function that is shared by the account 10 of the user A and the account 20 of the user B, the print queue 12 of the print conversion utility 07 for the account 10 of the user A, and the print queue of the print conversion utility 07 for the account 20 of the user B are registered. In this state, the user A deletes the print queue 05 of the OS standard print function, and thereafter the user B logs in and activates the print conversion utility 07. A process in this case will be described below as an example.

Figure 11:
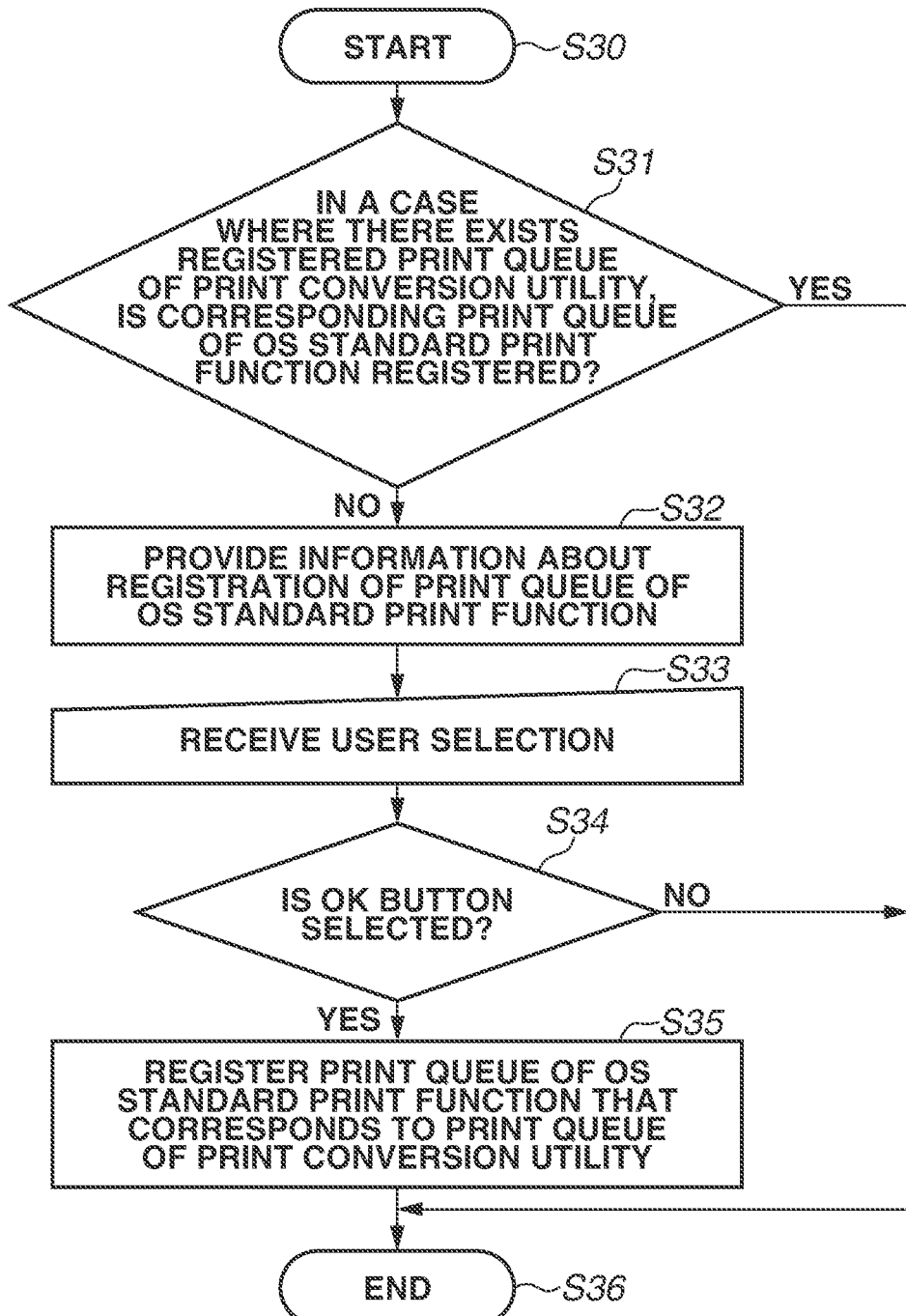
FIG. 11 is a flowchart illustrating a process of activating the print conversion utility.

FIG. 11 is a flowchart illustrating a process of activating the print conversion utility 07. If the user B activates the print conversion utility 07, the process in FIG. 11 is started, and the processing proceeds to step S30. While the print conversion utility 07 will be described below as an executor of each process, a corresponding function is realized by execution of a corresponding program by the CPU 201. The entire operations are not always executed sequentially on a single process, and there may be a case where the process is moved to the OS and then returned from the OS. The flowchart illustrates major operations of the print conversion utility 07 for convenience and ease of understanding.

In step S31, the print conversion utility 07 determines whether there is a printer that has the print queue 12 of the print conversion utility 07 registered but that does not have the print queue 05 of the OS standard print function registered. In other words, the print conversion utility 07 determines whether there is a printer that has the print queue 12 of the print conversion utility 07 registered but does not have the print queue 05 corresponding to the print queue 12 registered in the OS printing system 03. Specifically, for example, information (e.g., UUID) about printers registered in the print conversion utility 07 is acquired, and whether the acquired UUIDs are registered in the OS printing system 03 is determined. In a case where the print conversion utility 07 determines that there is a printer that has the print queue 12 of the print conversion utility 07 registered but that does not have the print queue 05 corresponding to the print queue 12 registered in the OS printing system 03 (NO in step S31), the processing proceeds to step S32. On the other hand, in a case where it is determined YES in step S31, the processing proceeds to step S36, and the process is ended.

Figure 12:
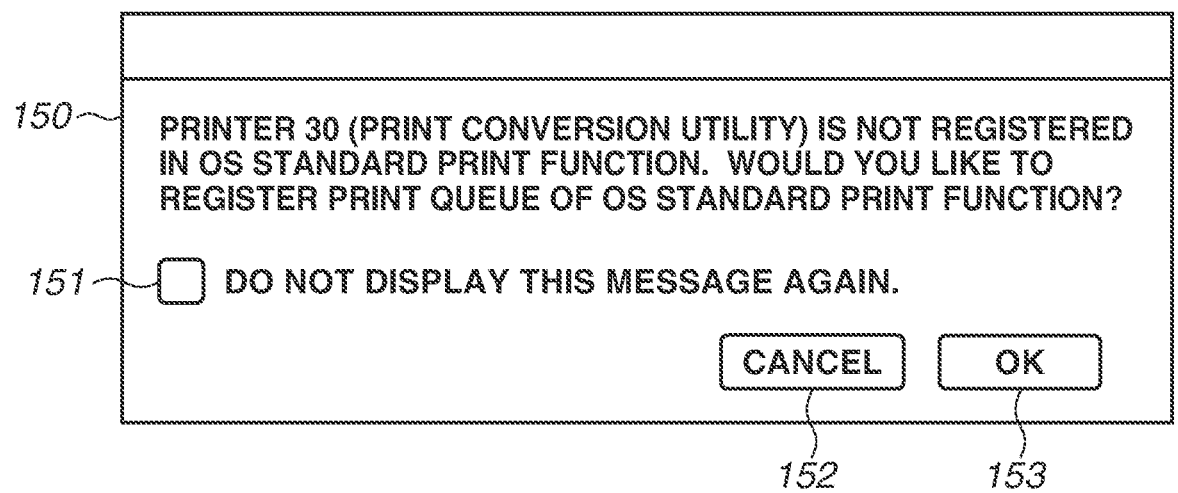
FIG. 12 is a schematic view illustrating a print queue registration guide dialog.

In step S32, the print conversion utility 07 provides a confirmation screen that prompts a user to confirm whether to register the print queue 05 of the OS standard print function. FIG. 12 illustrates a print queue registration dialog 150 of the OS standard print function that is provided by the print conversion utility 07 as an example of the confirmation screen.

In step S33, the print conversion utility 07 receives user selection on the print queue registration dialog 150. If a "DO NOT DISPLAY THIS MESSAGE AGAIN." checkbox is selected on the print queue registration dialog 150 by a user, the print conversion utility 07 does not display the dialog thereafter for that user. Specifically, thereafter, steps S32 to S34 are skipped and step S35 is executed in the case where it is determined NO in step S31 in the process illustrated in the flowchart in FIG. 11. Further, the "CHECK REGISTRATION STATE OF PRINT QUEUE AT LOGIN" checkbox 92 on the preferences screen 90 in FIG. 3 is unselected. For re-displaying, the preferences screen 90 in FIG. 3 is opened and the "CHECK REGISTRATION STATE OF PRINT QUEUE AT LOGIN" checkbox 92 is selected.

In step S34, the print conversion utility 07 determines whether an "OK" button 153 is selected on the print queue registration dialog 150. In a case where the "OK" button 153 is not selected (NO in step S34), the print conversion utility 07 determines that the print queue 05 of the OS standard print function is not to be registered, and the processing proceeds to step S36 and the process is ended. On the other hand, in a case where the print conversion utility 07 determines that the "OK" button 153 is selected (YES in step S34), the print conversion utility 07 determines that the print queue 05 of the OS standard print function is to be registered, and the processing proceeds to step S35.

In step S35, the print conversion utility 07 executes registering the print queue 05 in the OS standard print function using the UUID and model information acquired from the print queue 12 of the print conversion utility 07. Specifically, the print conversion utility 07 executes a registration command to issue an instruction to register the print queue 05 in the OS printing system 03.

As described above, in the present exemplary embodiment, the corresponding print queue is registered in the OS printing system 03 by referring to the print queue 12 of the print conversion utility 07. Thus, for example, even when the print queue 05 of the OS printing system 03 for the printer 30 is unintentionally deleted by the account 10 of the user A, a print queue of the printer 30 is registered in the OS printing system 03 based on the print queue 12 of the print conversion utility 07 for the printer 30 that is registered in the storage area of the account 20 of the user B. Therefore, the user B can execute printing with the printer 30 using the print conversion utility 07.

The present exemplary embodiment is not limited to the cases of multi-user login environments. The present exemplary embodiment is also applicable to, for example, a case where the user A registers both the print queue 12 of the print conversion utility 07 and the print queue 05 of the OS standard print function and thereafter deletes only the print queue 05 of the OS standard print function. Specifically, the present exemplary embodiment is also applicable to a case where the user A deletes the print queue 05 of the OS standard print function and thereafter re-activates the print conversion utility 07. In this case, the user A activates the print conversion utility 07 and the process illustrated in the flowchart in FIG. 11 is executed so that the print queue 05 of the OS standard print function is registered.

Fourth Exemplary Embodiment

Next, a fourth exemplary embodiment of the present invention will be described below. Redundant descriptions of similarities to the third exemplary embodiment are omitted, and only differences will be described below. In the third exemplary embodiment, in the case where there is a plurality of print queues 12 of the print conversion utility 07, all the corresponding print queues are registered in the OS printing system 03 regardless of the need of the user. In the fourth exemplary embodiment, in the case where there is a plurality of print queues 12 of the print conversion utility 07, a user can select a printer to be registered as the print queue 05 of the OS printing system 03.

Figure 13:
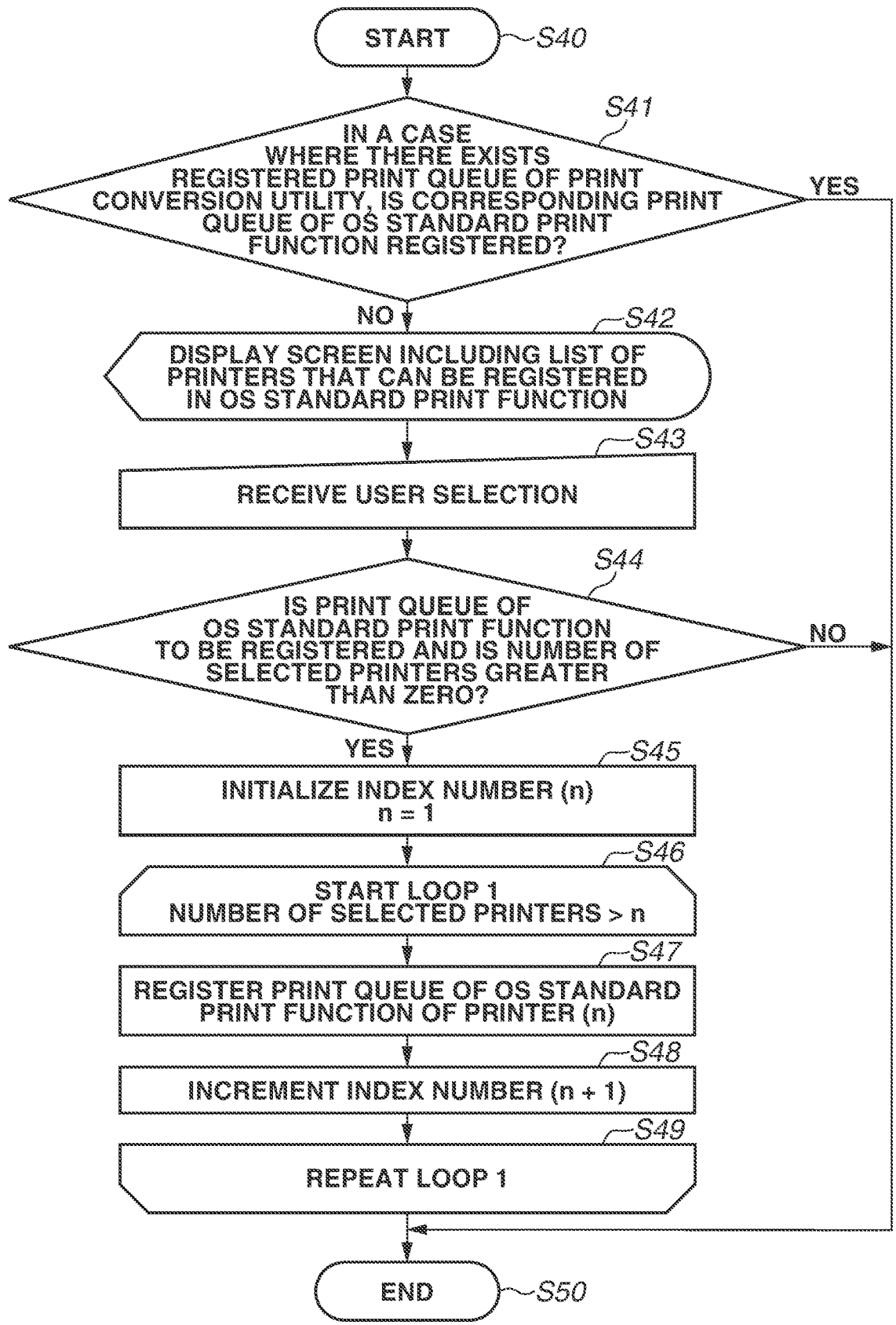
FIG. 13 is a flowchart illustrating a process of activating the print conversion utility.

FIG. 13 is a flowchart illustrating a process of activating the print conversion utility 07 according to the present exemplary embodiment. If the print conversion utility 07 is activated, the process in FIG. 13 is started, and the processing proceeds to step S40. If the user B activates the print conversion utility 07, the process in FIG. 13 is started, and the processing proceeds to step S40. While the print conversion utility 07 will be described below as an executor of each process, a corresponding function is realized by execution of a corresponding program by the CPU 201. The entire operations are not always executed sequentially on a single process, and there may be a case where the process is moved to the OS and then returned from the OS. The flowchart illustrates major operations of the print conversion utility 07 for convenience and ease of understanding.

In step S41, the print conversion utility 07 determines whether there is a printer that has the print queue 12 of the print conversion utility 07 registered but does not have the print queue 05 of the OS standard print function registered. Specifically, the print conversion utility 07 determines whether there is a printer that has the print queue 12 of the print conversion utility 07 registered but that does not have the corresponding print queue 05 registered in the OS printing system 03. Specifically, for example, the print conversion utility 07 acquires information (e.g., UUID) about printers registered in the print conversion utility 07 and determines whether the acquired UUIDs are registered in the OS printing system 03. In a case where the print conversion utility 07 determines that there is a printer that has the print queue 12 of the print conversion utility 07 registered but does not have the corresponding print queue 05 registered in the OS printing system 03 (NO in step S41), the processing proceeds to step S42. On the other hand, in a case where it is determined YES in step S41, the processing proceeds to step S50, and the process is ended.

In step S42, the print conversion utility 07 displays a selection screen 160 that prompts a user to select a printer for which the print queue 05 is to be registered in the OS printing system 03. In the present exemplary embodiment, the selection screen 160 including a printer list 161 of printers that can be registered in the print queue 05 of the OS standard print function as illustrated in FIG. 14 is displayed.

Figure 14:
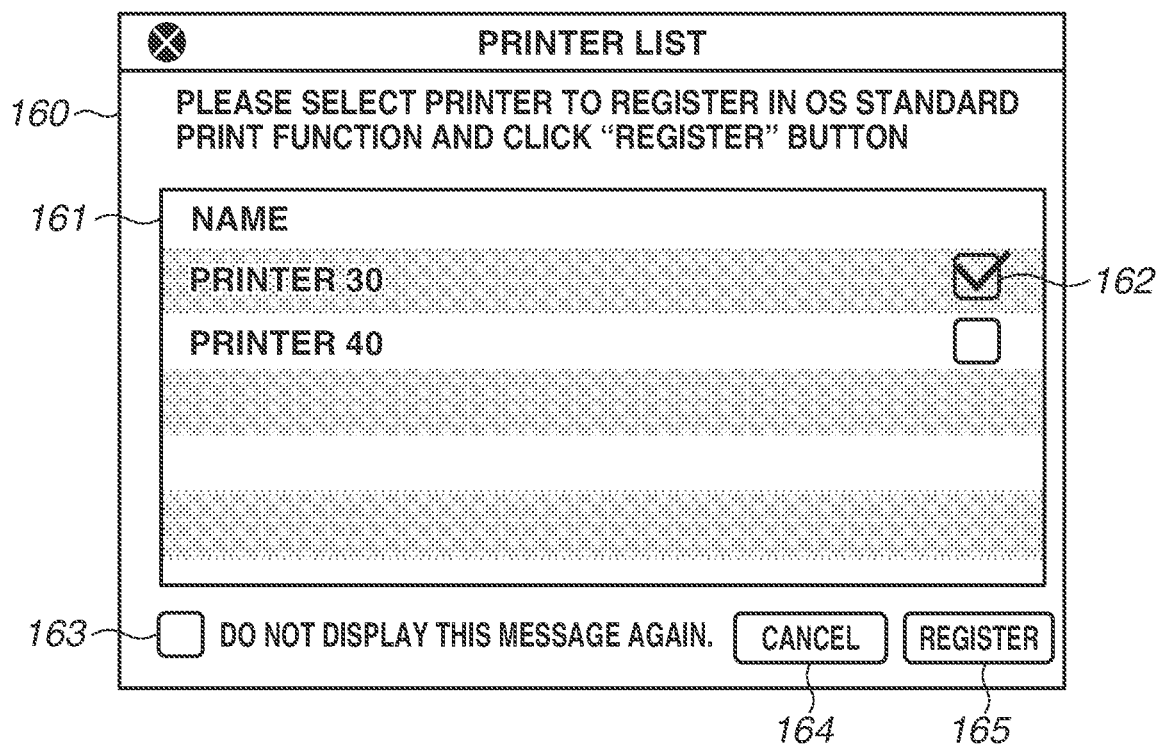
FIG. 14 is a schematic view illustrating a list of printers that can be registered in a print queue of the OS standard print function.

In step S43, the print conversion utility 07 receives user selection on the printer list 161 in FIG. 14. If a user selects a checkbox 162 of a printer to be registered in the OS printing system 03 on the printer list 161 and clicks a "REGISTER" button 165, the printer is selected as a registration target. In the present exemplary embodiment, a plurality of printers is selectable.

If a "DO NOT DISPLAY THIS MESSAGE AGAIN." checkbox 163 is selected by a user on the selection screen 160 in FIG. 14, the print conversion utility 07 does not display the dialog thereafter with for that user. Specifically, steps S42 to S44 are skipped and steps S45 to S49 are executed in the case where it is determined NO in step S41. Further, the "CHECK REGISTRATION STATE OF PRINT QUEUE AT LOGIN" checkbox 92 on the preferences screen 90 in FIG. 3 is unselected. For re-displaying, the preferences screen 90 in FIG. 3 is opened and the "CHECK REGISTRATION STATE OF PRINT QUEUE AT LOGIN" checkbox 92 is selected.

In step S44, the print conversion utility 07 determines whether there is one or more print queues to be registered in the OS standard print function. Specifically, in a case where a user selects one or more printers on the selection screen 160 in FIG. 14, the print conversion utility 07 determines that there is one or more print queues to be registered in the OS standard print function (YES in step S44). On the other hand, in a case where the user clicks a "CANCEL" button 164 on the selection screen 160 in FIG. 14, there is not a print queue to be registered in the OS printing system 03 (NO in step S44), so that the processing proceeds to step S50, and the process is ended.

In step S45, the print conversion utility 07 initialize the index number (n=1).

In step S46, the print conversion utility 07 starts loops corresponding to the number of selected printers.

In step S47, the print conversion utility 07 acquires the UUID and model information from the print queue 12 of the print conversion utility 07 of the nth printer and executes registration of the print queue 05 of the OS standard print function. Specifically, the print conversion utility 07 executes a registration command as an instruction to register the print queue 05 in the OS printing system 03.

In step S48, the print conversion utility 07 increments the index number (n+1).

In step S49, the print conversion utility 07 repeats processing a number of times corresponding to the number of selected printers. Consequently, the print queues 05 of the printers selected by the user are registered in the OS printing system 03.

As described above, in the present exemplary embodiment, in the case where there is a plurality of print queues 12 of the print conversion utility 07, the user is notified of a list of the registered print queues 12 so that the user can select a printer to be registered in the OS printing system 03. Thus, the user can register only the print queue 05 of the OS standard print function that the user desires.

The present exemplary embodiment is not limited to the cases of multi-user login environments. The present exemplary embodiment is also applicable to, for example, a case where the user A first registers the print queues 12 of the print conversion utility 07 and the print queues 05 of the OS standard print function that correspond to a plurality of printers and thereafter the user A deletes only the print queues 05 of the OS standard print function. Specifically, the present exemplary embodiment is also applicable to a case where the user A deletes all the print queues 05 of the OS standard print function and thereafter the user A re-activates the print conversion utility 07. In this case, the user A activates the print conversion utility 07 and the process illustrated in the flowchart in FIG. 13 is executed to thereby register the desired print queue(s) 05 of the OS standard print function.

Other Exemplary Embodiments

Figure 15:
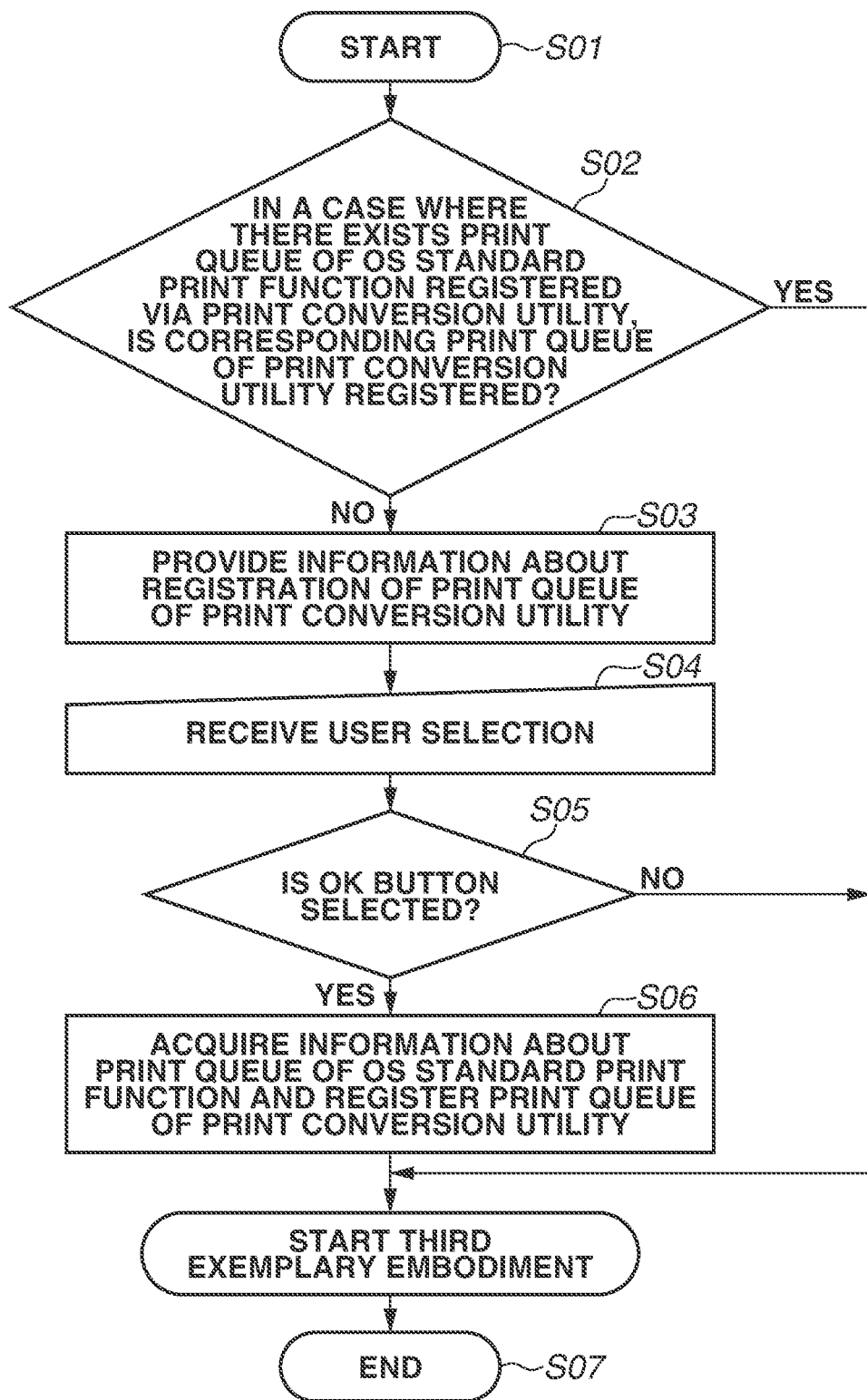
FIG. 15 is a flowchart illustrating a process of activating the print conversion utility.

In each of the exemplary embodiments described above, the print conversion utility 07 is activated so that the process of the print conversion utility 07 described in the exemplary embodiment is executed. Alternatively, the process illustrated in FIG. 11 according to the third exemplary embodiment or the process illustrated in FIG. 13 according to the fourth exemplary embodiment can be executed after the process illustrated in FIG. 7 according to the first exemplary embodiment or the process illustrated in FIG. 9 according to the second exemplary embodiment. For example, as illustrated in FIG. 15, the process illustrated in FIG. 11 according to the third exemplary embodiment can be executed at the end of the process illustrated in FIG. 7 according to the first exemplary embodiment.

Furthermore, the process illustrated in the flowchart in FIG. 7 according to the first exemplary embodiment or the process illustrated in the flowchart in FIG. 9 according to the second exemplary embodiment can be executed after the process illustrated in the flowchart in FIG. 11 according to the third exemplary embodiment or the process illustrated in the flowchart in FIG. 13 according to the fourth exemplary embodiment.

According to each of the first to fourth exemplary embodiments described above, in a case where a print queue is registered in one of the print conversion utility 07 and the OS printing system 03 but is not registered in the other one of the print conversion utility 07 and the OS printing system 03, the print queue is registered in the other one of the print conversion utility 07 and the OS printing system 03.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of controlling an information processing apparatus in which a print queue of a printing apparatus may be registered for print control software configured to generate print data in a predetermined format, and a print queue may be registered for predetermined software configured to generate print data in a different format from the predetermined format, wherein the predetermined software is different from the print control software, the method comprising:

registering the print queue of the printing apparatus for the print control software by an instruction from a user;

in a case where the print queue of the printing apparatus is registered for the print control software, executing a process of registering such that the print queue of the printing apparatus for the predetermined software is automatically registered; and in a case where the printing apparatus is selected, generating the print data in the predetermined format for the printing apparatus based on the print data obtained via the predetermined software.

2. The method according to claim 1, wherein whether a print queue corresponding to the print queue of the printing apparatus that is registered for the predetermined software is registered for the print control software is determined based on information about the printing apparatus registered for the predetermined software.

3. The method according to claim 1, wherein, in a case where the print queue of the printing apparatus for the predetermined software is registered by a first user account and thereafter the print control software is activated by a second user account different from the first user account, the print queue of the printing apparatus is registered in a storage area for the second user account for the print control software based on the print queue of the printing apparatus for the predetermined software.

4. The method according to claim 1, wherein, in a case where a print queue of a plurality of printing apparatuses is registered for the predetermined software but is not registered for the print control software, a first selection screen for selecting a printing apparatus to be registered for the print control software is provided, and wherein the print queue of the printing apparatus that is selected on the first selection screen is registered for the print control software.

5. The method according to claim 1, wherein, in the case where the print queue of the printing apparatus is registered in one of the print control software and the predetermined software but is not registered for the other one of the print control software and the predetermined software, a confirmation screen that prompts a user to confirm whether to register the print queue of the printing apparatus for the other one of the print control software and the predetermined software is displayed, and wherein, in a case where the user inputs an instruction to register the print queue of the printing apparatus for the other one of the print control software and the predetermined software on the confirmation screen, the process of registering the print queue of the printing apparatus for the other one of the print control software and the predetermined software is executed.

6. An information processing apparatus in which a print queue of a printing apparatus may be registered for print control software configured to generate print data in a predetermined format, and a print queue may be registered for predetermined software configured to generate print data in a different format from the predetermined format, wherein the predetermined software is different from the print control software, the information processing apparatus comprising:

one or more processors; and at least one memory storing executable instructions, which when executed by the one or more processors, cause the information processing apparatus to:
register the print queue of the printing apparatus for the print control software by an instruction from a user;
in a case where the print queue of the printing apparatus is registered for the print control software, execute a process of registering such that the print queue of the printing apparatus for the predetermined software is automatically registered; and
in a case where the printing apparatus is selected, generate the print data in the predetermined format for the printing apparatus based on the print data obtained via the predetermined software.

7. The information processing apparatus according to claim 6, wherein whether a print queue corresponding to the print queue of the printing apparatus that is registered for the print predetermined software is registered for the print control software is determined based on information about the printing apparatus registered for the predetermined software.

8. The information processing apparatus according to claim 6, wherein, in a case where the print queue of the printing apparatus for the predetermined software is registered by a first user account and thereafter the print control software is activated by a second user account different from the first user account, the print queue of the printing apparatus is registered in a storage area for the second user account for the print control software based on the print queue of the printing apparatus for the predetermined software.

9. The information processing apparatus according to claim 6, wherein, in a case where a print queue of a plurality of printing apparatuses is registered for the predetermined software but is not registered for the print control software, a first selection screen for selecting a printing apparatus to be registered for the print control software is provided, and
wherein the print queue of the printing apparatus that is selected on the first selection screen is registered for the print control software.

10. The information processing apparatus according to claim 6, wherein, in the case where the print queue of the printing apparatus is registered in one of the print control software and the predetermined software but is not registered for the other one of the print control software and the predetermined software, a confirmation screen that prompts a user to confirm whether to register the print queue of the printing apparatus for the other one of the print control software and the predetermined software is displayed, and
wherein, in a case where the user inputs an instruction to register the print queue of the printing apparatus for the other one of the print control software and the predetermined software on the confirmation screen, the process of registering the print queue of the printing apparatus for the other one of the print control software and the predetermined software is executed.

11. A non-transitory computer-readable medium storing executable instructions, which when executed by one or more processors of an information processing apparatus in which a print queue of a printing apparatus may be registered for print control software configured to generate print data in a predetermined format, and a print queue may be registered for predetermined software configured to generate print data in a different format from the predetermined format, wherein the predetermined software is different from the print control software, cause the information processing apparatus to:
register the print queue of the printing apparatus for the print control software by an instruction from a user;
in a case where the print queue of the printing apparatus is registered for the print control software, execute a process of registering such that the print queue of the printing apparatus for the predetermined software is automatically registered; and
in a case where the printing apparatus is selected, generate the print data in the predetermined format for the printing apparatus based on the print data obtained via the predetermined software.

12. The non-transitory computer-readable medium according to claim 11, wherein whether a print queue corresponding to the print queue of the printing apparatus that is registered for the predetermined software is registered for the print control software is determined based on information about the printing apparatus registered for the predetermined software.

13. The non-transitory computer-readable medium according to claim 11, wherein, in a case where the print queue of the printing apparatus for the predetermined software is registered by a first user account and thereafter the print control software is activated by a second user account different from the first user account, the print queue of the printing apparatus is registered in a storage area for the second user account for the print control software based on the print queue of the printing apparatus for the predetermined software.

14. The non-transitory computer-readable medium according to claim 11, wherein, in a case where a print queue of a plurality of printing apparatuses is registered for the predetermined software but is not registered for the print control software, a first selection screen for selecting a printing apparatus to be registered for the print control software is provided, and
wherein the print queue of the printing apparatus that is selected on the first selection screen is registered for the print control software.

15. The non-transitory computer-readable medium according to claim 11, wherein, in the case where the print queue of the printing apparatus is registered in one of the print control software and the predetermined software but is not registered for the other one of the print control software and the predetermined software, a confirmation screen that prompts a user to confirm whether to register the print queue of the printing apparatus for the other one of the print control software and the predetermined software is displayed, and
wherein, in a case where the user inputs an instruction to register the print queue of the printing apparatus for the other one of the print control software and the predetermined software on the confirmation screen, the process of registering the print queue of the printing apparatus for the other one of the print control software and the predetermined software is executed.

\* \* \* \* \*